United States Patent
Gallagher et al.

(10) Patent No.: US 7,245,781 B2
(45) Date of Patent: *Jul. 17, 2007

(54) APPLYING A TONE SCALE FUNCTION TO A DIGITAL IMAGE

(75) Inventors: Andrew C. Gallagher, Brockport, NY (US); Edward B. Gindele, Rochester, NY (US)

(73) Assignee: Eastman Kodak Companny, Rochester, NY (US)

( * ) Notice: Subject to any disclaimer, the term of this patent is extended or adjusted under 35 U.S.C. 154(b) by 649 days.

This patent is subject to a terminal disclaimer.

(21) Appl. No.: 10/692,220

(22) Filed: Oct. 23, 2003

(65) Prior Publication Data

US 2005/0089240 A1 Apr. 28, 2005

(51) Int. Cl.
*G06K 9/40* (2006.01)

(52) U.S. Cl. ............... 382/274; 382/162; 382/261

(58) Field of Classification Search ............ 382/274, 382/169, 277, 162, 260; 358/1.9, 528, 169
See application file for complete search history.

(56) References Cited

U.S. PATENT DOCUMENTS

| | | | |
|---|---|---|---|
| 4,731,671 A | 3/1988 | Alkofer | |
| 4,745,465 A | 5/1988 | Kwon | |
| 5,541,028 A * | 7/1996 | Lee et al. | 430/30 |
| 5,724,456 A * | 3/1998 | Boyack et al. | 382/274 |
| 6,167,165 A | 12/2000 | Gallagher et al. | |
| 6,285,798 B1 * | 9/2001 | Lee | 382/260 |
| 6,317,521 B1 * | 11/2001 | Gallagher et al. | 382/260 |
| 6,563,945 B2 * | 5/2003 | Holm | 382/162 |
| 6,792,160 B2 * | 9/2004 | Shaw et al. | 382/272 |
| 6,993,200 B2 * | 1/2006 | Tastl et al. | 382/240 |
| 7,130,485 B2 * | 10/2006 | Gindele et al. | 382/274 |

* cited by examiner

*Primary Examiner*—Joseph Mancuso
*Assistant Examiner*—Claire Wang
(74) *Attorney, Agent, or Firm*—Raymond L. Owens

(57) ABSTRACT

A method of applying a tone scale function that is compressive, expansive or a combination of both to a digital image, the method including decomposing the tone scale function into two or more composite functions that can be applied sequentially to the digital image; applying the first composite function to the digital image with a tone scale applicator to produce a tone scaled digital image; and applying the second composite function to the tone scaled digital image to produced an enhanced digital image.

10 Claims, 5 Drawing Sheets

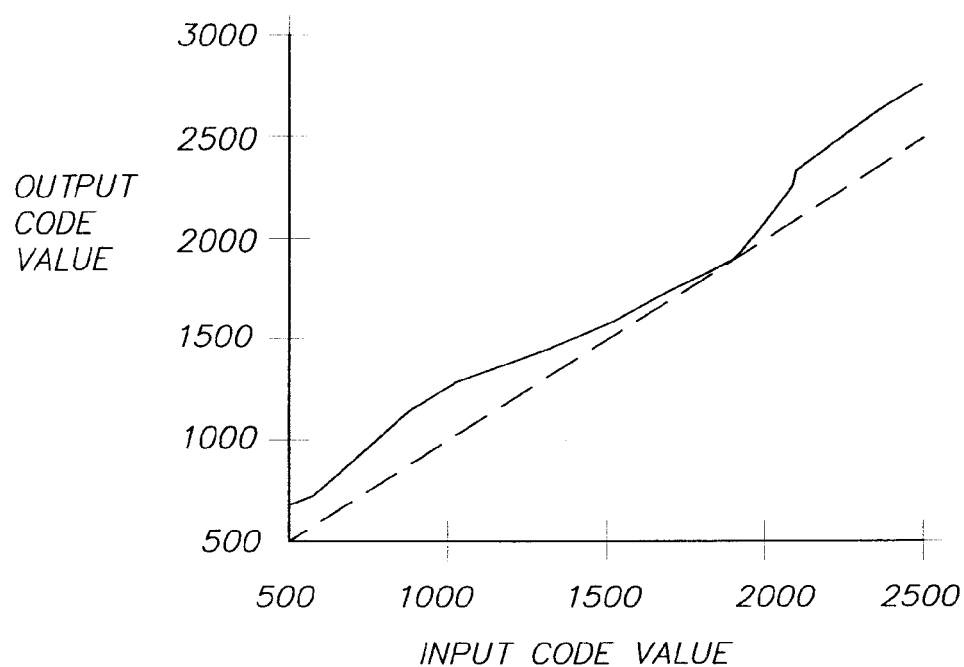
FIG. 4A  (T(x))
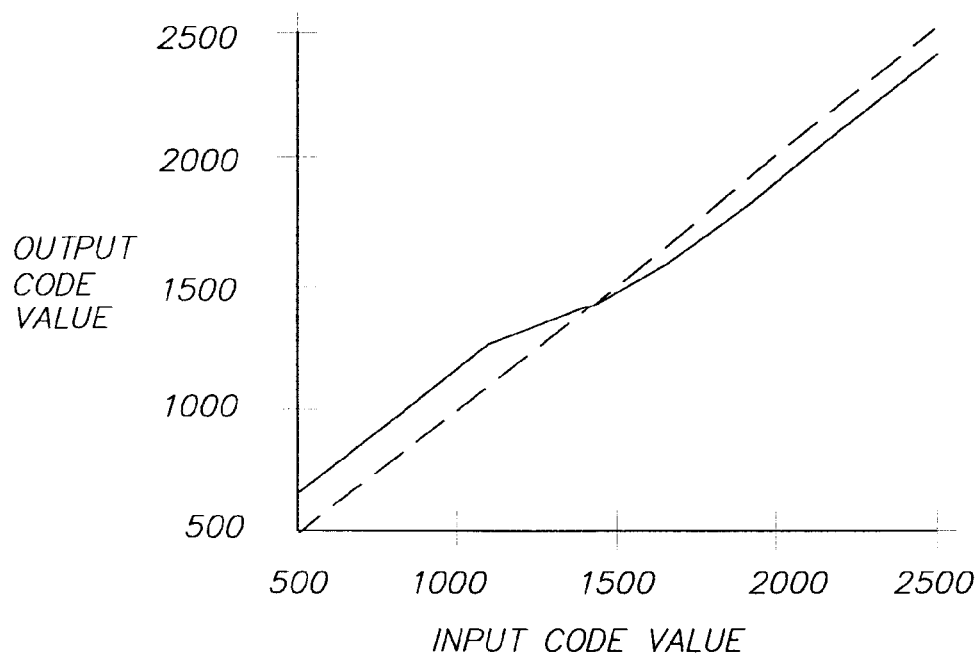
FIG. 4B  ($T_1(x)$)

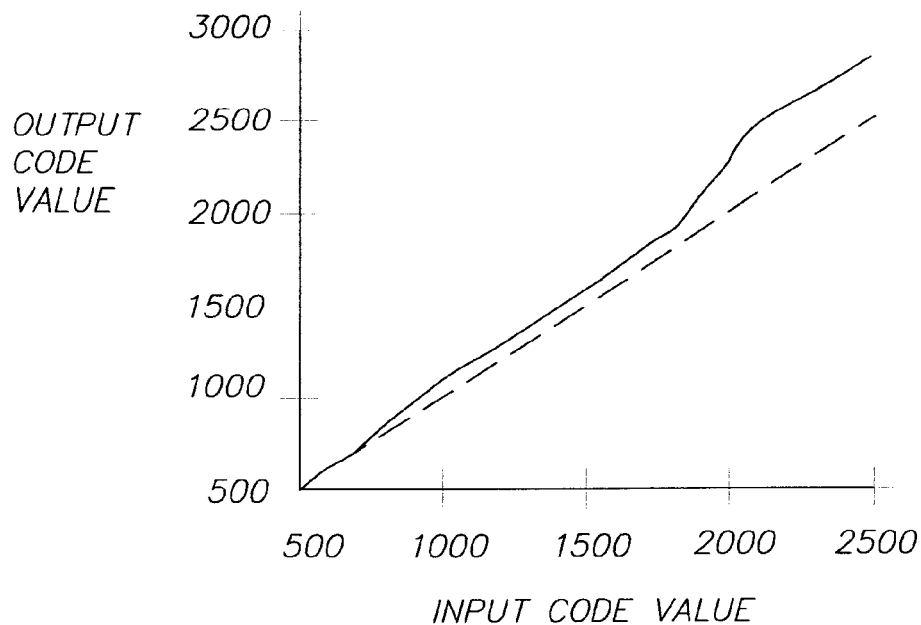
FIG. 4C $(T_2(x))$
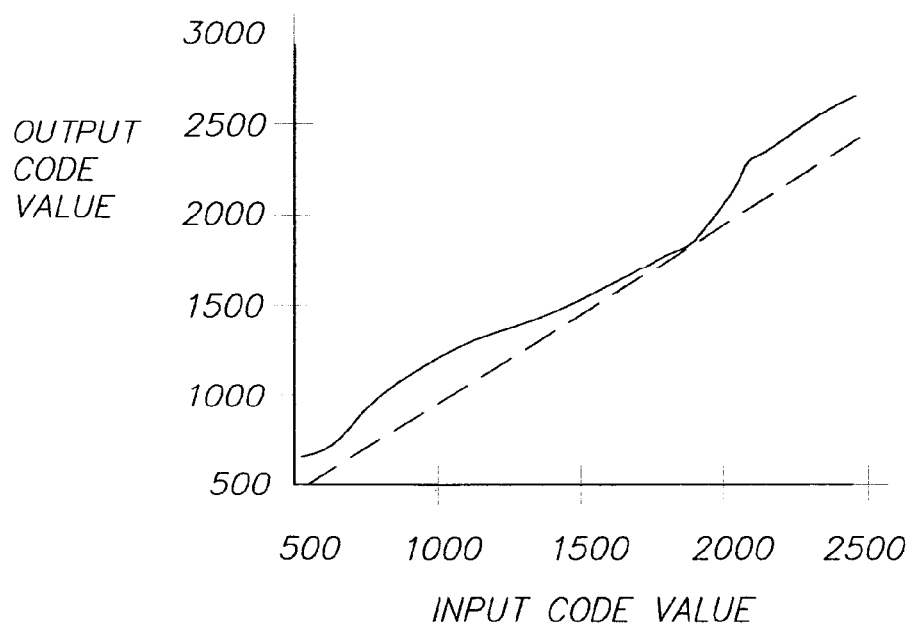
FIG. 4D $(T_2(T_1(x)))$

APPLYING A TONE SCALE FUNCTION TO A DIGITAL IMAGE

CROSS REFERENCE TO RELATED APPLICATIONS

Reference is made to commonly assigned U.S. patent application Ser. No. 10/145,937, filed May 15, 2002, entitled "A Method of Enhancing the Tone Scale of a Digital Image to Extend the Linear Response Range Without Amplifying Noise" by Gindele et al; U.S. patent application Ser. No. 10/163,401, filed Jun. 6, 2002, entitled "A Multiresolution Method of Spatially Filtering a Digital Image" by Gindele et al; U.S. Ser. No. 10/263,110 filed Oct. 2, 2002, entitled "Enhancing the Tonal Characteristics of Digital Images Using Expansive and Compressive Tone Scale Functions" by Gindele et al; U.S. patent application Ser. No. 10/263,113, filed Oct. 2, 2002, entitled "Enhancing the Tonal and Color Characteristics of Digital Images Using Expansive and Compressive Tone Scale Functions" by Gindele et al; U.S. patent application Ser. No. 10/280,372, filed Oct. 25, 2002, entitled "Enhancing the Tonal and Spatial Characteristics of Digital Images Using Selective Spatial Filters" by Gindele et al, and U.S. patent application Ser. No. 10/280,369 filed Oct. 25, 2002, entitled "Enhancing the Tonal, Spatial, and Color Characteristics of Digital Images Using Expansive and Compressive Tone Scale Functions" by Gindele et al, the disclosures of which are incorporated herein.

FIELD OF INVENTION

The present invention relates to an improved ways of applying a tone scale function to a digital image.

BACKGROUND OF THE INVENTION

Many digital imaging systems enhance the contrast and lightness characteristics of digital images through the application of a tone scale curve. For a generalized tone scale curve T(x), the input pixel value x is transformed to an output pixel value T(x). The shape of the tone scale curve determines the visual effect imparted to the processed digital image. Some tone scale curves applied to digital image are independent of the pixel values in the digital image to be processed. Such image independent tone scale curves are useful for establishing a photographic look to the processed digital images. While image independent tone scale curves can be used to enhance many digital images, digital images that are either too high or low in contrast can benefit from the application of a tone scale curve that is responsive to the distribution of pixel values in the digital image to be processed. For image dependent tone scale curves, the mathematical formula used to generate the tone scale function determines the degree and nature of the image enhancement.

When a compressive tone scale function, i.e. the tone scale function designed to reduce the numerical range of pixel values, is applied directly to image pixel data, the spatial detail in the image can be diminished. In addition, if the compressive tone scale function is applied directly to a color digital image that is in a red-green-blue representation, the tone scale function can reduce the colorfulness (saturation) characteristics of the processed digital image. In general, better results can be achieved if the compressive tone scale function is applied directly to the luminance signal of a luminance-chrominance image representation. This procedure leaves the chrominance signals unchanged but can lead to processed images that have diminished spatial detail.

In the method disclosed by Gallagher and Gindele in U.S. Pat. No. 6,167,165, the spatial detail of the processed image can be mostly restored. In this method, a tone scale function is applied directly to the luminance signal and the spatial frequency detail of the tone scale modified luminance signal is adjusted inversely proportional to the slope of the applied tone scale function. The resultant processed digital images have more spatial detail and appear more natural.

A spatial filter can be used to apply a tone scale function to a digital image in such a manner that the image spatial detail will be relatively unaffected. This is particularly useful for compressive tone scale functions designed to reduce the image dynamic range. Such spatial filtering methods have been disclosed in U.S. Pat. Nos. 6,317,521 and 6,285,798. When applying compressive tone scale functions to the luminance signal with a spatial filter, the color characteristics of the processed digital images look more natural even though the chrominance signals are not modified.

In U.S. Pat. No. 6,317,521 Gallagher and Gindele disclose spatial filtering method for applying tone scale functions to digital images. In this method, the luminance channel of a luminance-chrominance representation digital image is separated into two signal parts. A tone scale function is applied directly to one of the signal parts and the other signal part is added back to the modified signal part. Tone scale functions generated with the methods disclosed in U.S. Pat. Nos. 4,731,671 and 4,745,465 have been applied with the spatial filtering method disclosed in U.S. Pat. No. 6,317,521 with success. In general, more spatial detail is preserved in the enhanced digital images than if a spatial filter were not used.

Low contrast images are enhanced by applying an expansive tone scale function designed to increase the numerical range of pixel values. Simple histogram stretching methods are well known in the art. Typically a histogram is calculated from the image pixel values and the minimum and maximum pixel values are obtained. A tone scale function is constructed using a linear transform equation that expands the pixel values to achieve a predetermined goal. For example the minimum pixel value is mapped to a lower pixel value while the maximum pixel value is mapped to a higher pixel value. Applying an expansive tone scale function to image pixel data when in a red-green-blue representation has the effect of increasing image contrast, color saturation, spatial detail, and noise. In general, the increase in contrast and spatial detail is viewed as an improvement in image quality. However, the increase in noise can reduce image quality.

In U.S. Pat. No. 6,285,798 Lee discloses a method for construction a compressive tone scale function and a wavelet based spatial filtering technique for applying the compressive tone scale function to image data. This spatial filtering technique helps preserve image detail while enhancing the tonal characteristics with the compressive nature of the tone scale function. That is, the tone scale functions produced by Lee's method compress, or reduce, the scene dynamic range of the image data. Lee's method does not account for the possibility that some digital images require an expansion of the dynamic range of the digital image to achieve enhancement.

The above mentioned methods are individually designed to either avoid or remedy specific problems with image spatial detail when for applying tone scale functions to digital images.

SUMMARY OF THE INVENTION

It is an object of the present invention to provide improved ways of applying tone scale function to digital images that are either compressive or expansive or a combination of both.

This object is achieved by a method of applying a tone scale function that is compressive, expansive or a combination of both to a digital image, the method comprising:

a) decomposing the tone scale function into two or more composite functions that can be applied sequentially to the digital image;

b) applying the first composite function to the digital image with a tone scale applicator to produce a tone scaled digital image; and c) applying the second composite function to the tone scaled digital image to produced an enhanced digital image.

It is an advantage of the present invention that by decomposing tone scale function into two or more composite functions that can be sequentially applied to the digital image a higher quality tone scaled image can be achieved. Also this arrangement can simplify the application process. Moreover, it has been found that by using a spatial filter significant improvements in enhancement of spatial detail can be made.

BRIEF DESCRIPTION OF THE DRAWINGS

FIG. 4A is an example of a tone scale function;

FIG. 4B is a first composite tone scale function derived from a decomposition of the tone scale function of FIG. 4A;

FIG. 4C is a second composite tone scale function derived from a decomposition of the tone scale function of FIG. 4A; and FIG. 4D is the composition of the two composite tone scale functions, illustrating their substantial equivalence when used sequentially to the tone scale function of FIG. 4A.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
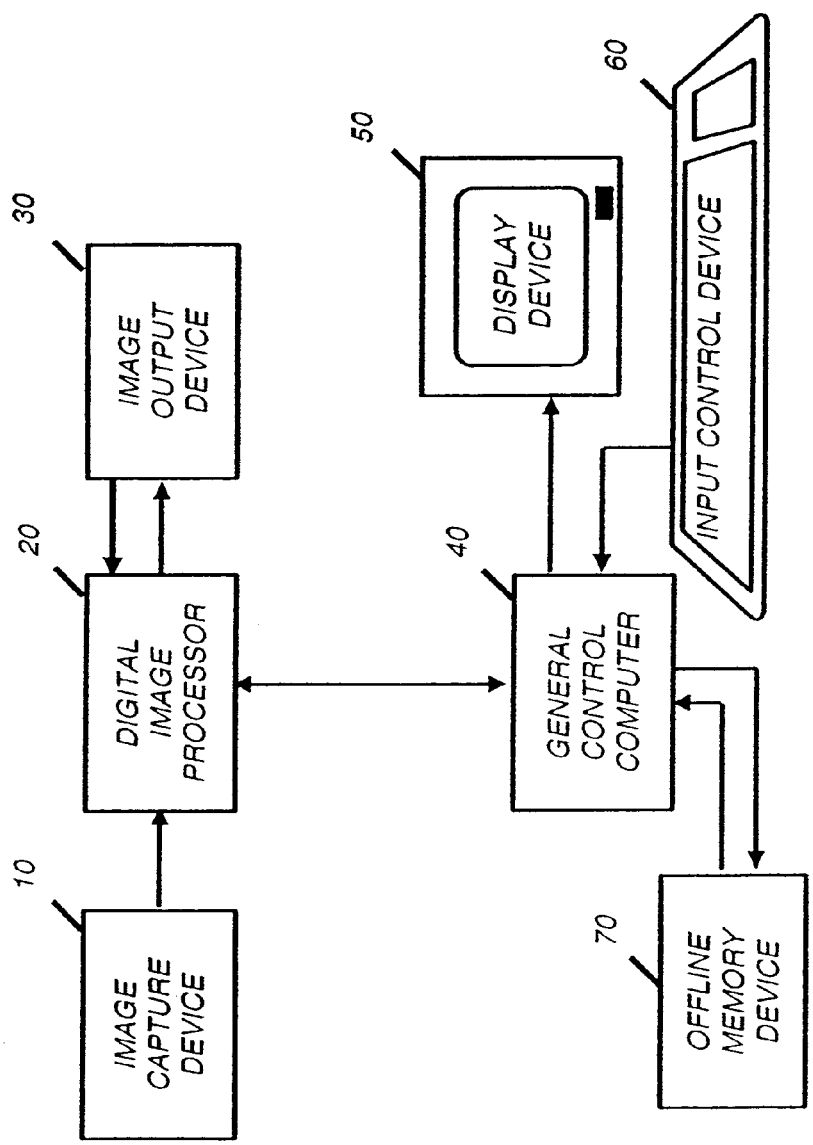
FIG. 1 is a block diagram of a computer system suitable for practicing the present invention.

The present invention may be implemented in computer hardware. Referring to FIG. 1, the following description relates to a digital imaging system which includes an image capture device 10, a digital image processor 20, an image output device 30, and a general control computer 40. The system can include a display device 50 such as a computer console or paper printer. The system can also include an input control device 60 for an operator such as a keyboard and or mouse pointer. The present invention can be used on multiple image capture devices 10 that produce digital images. For example, FIG. 1 can represent a digital photofinishing system where the image capture device 10 is a conventional photographic film camera for capturing a scene on color negative or reversal film, and a film scanner device for scanning the developed image on the film and producing a digital image. The digital image processor 20 provides the means for processing the digital images to produce pleasing looking images on the intended output device or media. The present invention can be used with a variety of output devices 30 that can include, but are not limited to, a digital photographic printer and soft copy display. The digital image processor 20 can be used to process digital images to make adjustments for overall brightness, tone scale, image structure, etc. of digital images in a manner such that a pleasing looking image is produced by an image output device 30. Those skilled in the art will recognize that the present invention is not limited to just these mentioned image processing functions.

The general control computer 40 shown in FIG. 1 can store the present invention as a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention can be implemented in a combination of software and/or hardware and is not limited to devices which are physically connected and/or located within the same physical location. One or more of the devices illustrated in FIG. 1 may be located remotely and may be connected via a wireless connection.

A digital image is comprised of one or more digital image channels. Each digital image channel is comprised of a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the above mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

Figure 2:
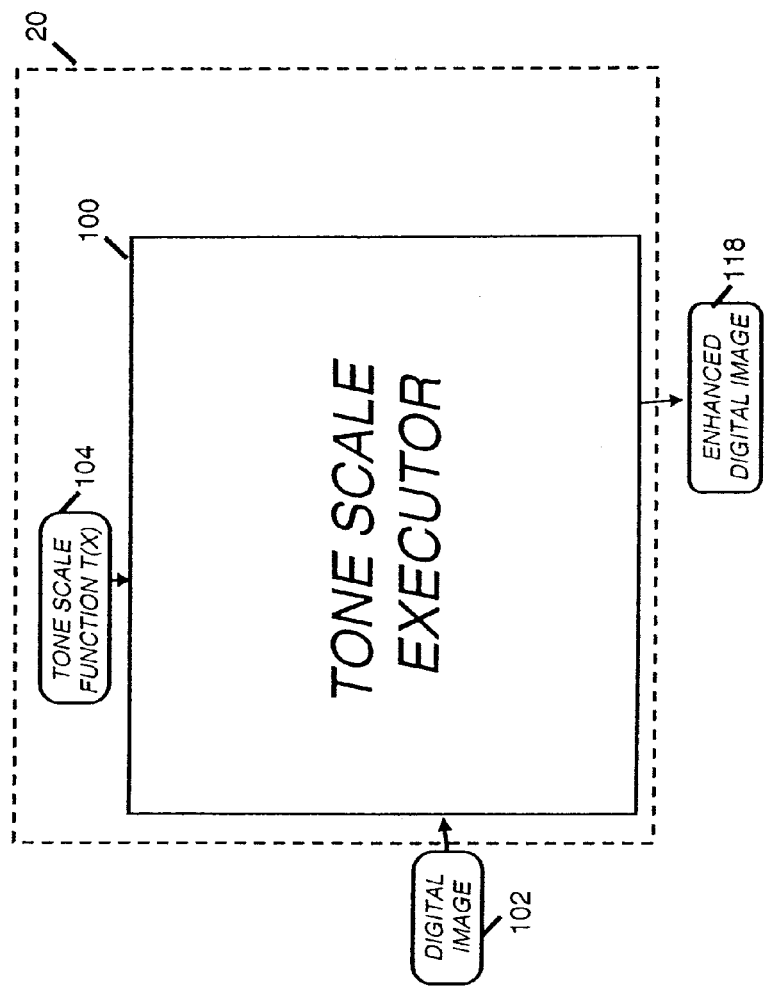
FIG. 2 is a block diagram of the digital image processor of FIG. 1 according to the present invention.

The digital image processor 20 shown in FIG. 1 and programmed to perform the method of the present invention is illustrated in more detail in FIG. 2. An original digital image 102 can be received from the image capture device (shown in FIG. 1) in a variety of different color representations. However, the most typical implementation of the present invention receives the original digital image as a color digital image with red, green, and blue digital image channels. Preferably, the pixel values of the original digital image are related to the log of the scene intensity and each pixel value of each color channel is represented as a 12-bit value 0 to 4095. Preferably, every 188 code values represents a doubling of scene intensity (i.e. a photographic stop). For example, a first pixel having a value of 1688 represents a scene intensity that is twice as great as a second pixel having a value of 1500. The present invention can operate successfully with other encodings, although modification to equation constants and shapes of functions may be required.

The digital image 102 is input to a tone scale executor 100, along with a tone scale function T(x) 104. The tone scale executor 100 applies the tone scale function 104 to the digital image 102, producing an enhanced digital image 118. The tone scale function T(x) 104 is preferably derived by an analysis of the digital image 102, as described by Lee et al in U.S. Pat. No. 5,822,453 to calculate and output the tone scale function T(x) 104. The present invention can also be used with tone scale functions that are not derived from an analysis of the original digital image 102, i.e. scene independent tone scale functions.

Figure 3:
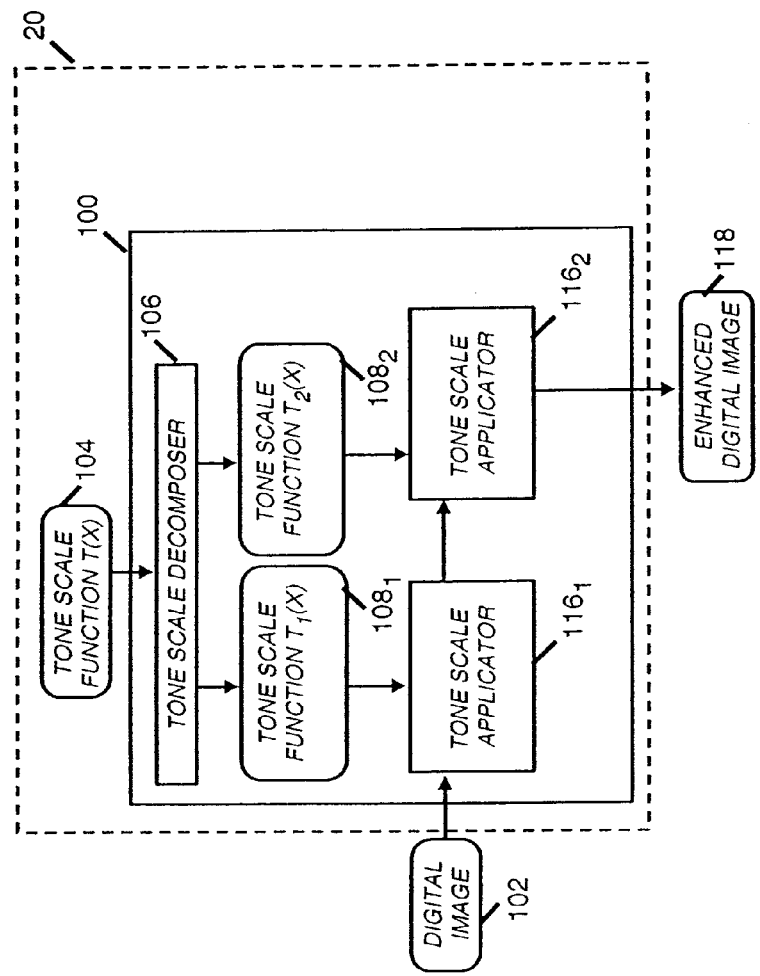
FIG. 3 is a block diagram of the tone scale executor shown in FIG. 2.

FIG. 3 illustrates a more detailed view of the tone scale executor 100. The tone scale function T(x) 104 is first passed to a tone scale decomposer 106. The tone scale decomposer 106 generates two or more composite functions from the tone scale function 104. Preferably and as illustrated, the tone scale decomposer 106 inputs the tone scale function T(x) 104 and generates a composite tone scale function $T_1(x)$ 108$_1$ and a tone scale function $T_2(x)$ 108$_2$. The generated composite functions are such that by combining them, the original tone scale function T(x) 104 can be obtained. The combination is preferably a composition. Mathematically, $$T(x)=T_2(T_1(x))$$

In practice, the composition $T_2(T_1(x))$ need not be an exact match to T(x). For example, $T(x)=T_2(T_1(x))+N$ where |N|<n and n is a small number that accounts for errors due to rounding, quantization, sampling, and the like. Preferably when the domain of x=0 to 4095, n is 1.5. Because n is small in comparison to the domain of T(x), the composition $T_2(T_1(x))$ is substantially equal to the tone scale function T(x).

FIGS. 4A-D show examples of the tone scale function T(x) 104, the composite functions $T_1(x)$ 108$_1$ and $T_2(x)$ 108$_2$, and the composition $T_2(T_1(x))$.

Preferably the composite functions are generated with the following procedure: First the slope $T_S(x)$ of the tone scale function T(x) is calculated. When the tone scale function is specified according to a functional equation, calculus provides the means (by computing derivatives) for computing the slope function $T_S(x)$. When the tone scale function is given as a LUT, the slope $T_S(x)$ is calculated according to the equation:

$$T_S(x)=[T(x+m)-T(x-m)]/(2m)$$

where m is an integer (preferably m=7). Next, the slope $T_S(x)$ is limited by a clipping operation. Preferably, a modified slope function is created by limiting the maximum value of the slope function to $S_0$ (preferably 1.0). Then the first composite function $T_1(x)$ is created by integration of the modified slope function. Thus, in the preferred case the slope of the first composite function never exceeds $S_0$. Such a function is referred to as a compressive tone scale function. Alternatively, the modified slope function is created by limiting the minimum value of the slope function to $S_0$. The composite function generated from such a modified slope function has a slope that always is at least $S_0$, and is referred to as an expansive tone scale function.

The first composite function $T_1(x)$ is generated by the following equation:

$T_1(x)=T_1(x-1)+T_S'(x)$ over x>=1 and x<=4095 where $T1(0)=T(0)$

And $T_S'(x)$ is the modified slope function.

The second composite function $T_2(x)$ 108$_2$ is generated such that $T_2(T_1(x))$ is as close as possible to the value of T(x). The procedure is as follows: $T_1(x)$ and T(x) are evaluated for all X. At each $T_1(x)$, $T_2(T_1(x))$ is set equal to T(x). Well-known linear interpolation is used to determine the values of the second composite function when necessary. In the preferred embodiment where the first composite tone scale function $T_1(x)$ is compressive, the second composite tone scale function $T_2(x)$ is expansive.

Those skilled in the art will recognize that although the output for the tone scale decomposer 106 is two composite tone scale functions, the output alternatively could have been three or more composite tone scale functions 108. For example, the tone scale decomposer 106 could output tone scale functions $T_1(x)$, $T_2(x)$, $T_3(x)$, ..., $T_n(x)$, ..., $T_N(x)$ such that:

$T_N(\ldots(T_n(\ldots(T_3(T_2(T_1(x))))))))$ substantially equals T(x)

In this scenario, each tone scale function would be input to a different tone scale applicator 116$_n$ for application of the tone scale function 108$_n$ to the digital image.

Referring again to FIG. 3, the digital image 102 is passed to the tone scale applicator 116$_1$ for application of the first composite tone scale function $T_1$ (x) 108$_1$. The tone scale applicator 116$_1$ applies the tone scale function 108$_1$ to the digital image 102 and outputs a modified digital image. The modified digital image is passed to a tone scale applicator 116$_2$ for application of the second composite function $T_2(x)$. The process continues for the alternative case where the tone scale decomposer 106 produces three or more composite tone scale functions 108. The second tone scale applicator 116$_2$ outputs the enhanced digital image 118.

Each tone scale applicator 116$_n$ applies its input composite tone scale function 108$_n$ to its input digital image in a manner that is appropriate for that tone scale function. Thus, the action of each tone scale applicator 116 can be different. In the preferred embodiment, the composite tone scale function $T_1(x)$ is compressive and the tone scale applicator 116$_1$ uses the method described in above cited U.S. patent application Ser. No. 10/163,401 to apply the compressive tone scale function to the image. Briefly summarized, the tone scale applicator 116$_1$ first transforms the input digital image channels to a luminance image channel and several chrominance channels. The luminance channel is then separated into a pedestal signal and a texture signal. The pedestal signal contains major lighting edges and smooth gradients (which will be affected by the tone scale function) while the texture signal contains image details (which will not be affected by the tone scale function. The separation into the pedestal signal and the texture signal is accomplished by reconstructing a non-linearly filtered multi-resolution representation of the luminance channel. The compressive composite tone scale function $116_1$ is applied to the pedestal signal and the texture signal is added to the result, forming the enhanced luminance channel. The modified digital image can be represented with either the luminance and chrominance channels, or a color transformation can be applied to represent the modified digital image with the same channels as the original image (e.g. red, green, and blue channels.)

The modified digital image is then input to the tone scale applicator $116_2$ for application of the composite tone scale function $T_2(x)$ $108_2$. In the preferred embodiment, the composite tone scale function $T_2(x)$ $108_2$ is expansive and the tone scale applicator $116_2$ simply applies the tone scale function $108_2$ directly to the luminance channel of the digital image, creating an enhanced digital image 118. Alternatively, the tone scale applicator $116_2$ can apply the composite tone scale function $T_2(x)$ $108_2$ with a noise filter to prevent amplification of image noise as described in above cited U.S. patent application Ser. No. 10/145,937 or to each channel of a RGB image representation.

In the above description, the first composite tone scale function $T_1(x)$ $108_1$ is compressive and the second composite tone scale function $T_2(x)$ $108_2$ is expansive. Alternatively, the first composite tone scale function $T_1(x)$ $108_1$ can be expansive (and the tone scale applicator $116_1$ preferably applies it via the method of above cited U.S. patent application Ser. No. 10/145,937) and the second composite tone scale function $T_2(x)$ $108_2$ can be compressive (and the tone scale applicator $116_1$ preferably applies it via the method of above cited U.S. patent application Ser. No. 10/163,401).

The tone scale decomposer 106 may use other characteristics (besides slope) to decompose the tone scale function $T(x)$ 104 into composite tone scale functions 108. For example, $T_1(x)=T(x)$ when $x<B$, $x$ otherwise $T_2(x)=T(x)$ when $x>=B$, $x$ otherwise Where B is a values for which $T(B)=B$. This separates the composite tone scale functions according to regions of the domain of the tone scale function $T(x)$. This means that the first composite tone scale function $T1(x)$ $108_1$ primarily controls changes to image shadows, and the second composite tone scale function $T2(x)$ $108_2$ primarily controls the changes to image highlights.

Note that a tone scale applicator $106_n$ may actually contain within itself a tone scale executor 100 to further generate composite tone scale functions from the input composite tone scale function $108_n$.

In essence, the operation of the tone scale executor 100 is to input a digital image 102 and a tone scale function 104 to apply to the digital image 102. The tone scale function 104 is decomposed into two or more composite tone scale functions, the composition of which is essentially the original tone scale function. These composite tone scale functions are then applied in the correct order by an appropriate method. The method of application is individualized to each composite tone scale function. In this way, certain characteristics of the tone scale function can be concentrated into a specific composite tone scale function, and the method of application of that composite tone scale function is then optimized for the aforementioned characteristics.

The method of the present invention can be performed in a digital camera, a digital printer, or on a personal computer.

The invention has been described in detail with particular reference to certain preferred embodiments thereof, but it will be understood that variations and modifications can be effected within the spirit and scope of the invention.

| PARTS LIST | |
|---|---|
| 10 | image capture device |
| 20 | digital image processor |
| 30 | image output device |
| 40 | general control computer |
| 50 | display device |
| 60 | input control device |
| 70 | offline memory device |
| 100 | tone scale executor |
| 102 | digital image |
| 104 | tone scale function |
| 106 | tone scale decomposer |
| $108_{1-N}$ | composite tone scale functions |
| $116_{1-N}$ | tone scale applicators |
| 118 | enhanced digital image |

What is claimed is:

1. A method of applying a tone scale function $T(x)$ that is compressive and expansive to a digital image, the method comprising:
   a) decomposing the tone scale function into at least two composite functions that can be applied sequentially to the digital image, wherein the first composite function is $T_1(x)$, the second composite function is $T_2(x)$, and the tone scale function $T(x)$ is substantially equal to $T_2(T_1(x))$, wherein x is a pixel value and function $T_1(x)$ contains a maximum slope and function $T_2(x)$ contains a minimum slope;
   b) applying the first-composite function to the digital image with a tone scale applicator to produce a tone scaled digital image; and
   c) applying the second composite function to the tone scaled digital image to produce an enhanced digital image.

2. The method claimed in claim 1, wherein the maximum slope of $T_1(x)$ is greater than or equal to the minimum slope of the second composite function $T_2(x)$ when plotted as a function of input versus output.

3. The method claimed in claim 2, wherein the maximum and minimum slopes of $T_1(x)$ and $T_2(x)$ respectively are equal to 1.

4. A method of applying a tone scale function $T(x)$ that is compressive and expansive to a digital image, the method comprising:
   a) decomposing the tone scale function into at least two composite functions the first being compressive, and the second being expansive that can be applied sequentially to the digital image;
   b) applying the first-composite function to the digital image with a tone scale applicator with a spatial filter to produce a tone scaled digital image; and
   c) applying the second composite function to the tone scaled digital image to produced an enhanced digital image and the first composite function contains a maximum slope and the second composite function contains a minimum slope.

5. The method of claim 4 wherein the spatial filter is designed to remove noise, enhance or preserve detail or both.

6. The method claimed in claim 4, wherein the first composite function is $T_1(x)$, the second composite function is $T_2(x)$, the tone scale function is $T(x)$ and the tone scale function $T(x)$ is substantially equal to $T_2(T_1(x))$, wherein x is a pixel value.

7. The method claimed in claim 6, wherein the maximum slope of $T_1(x)$ is greater than or equal to the minimum slope of $T_2(x)$ the second composite function when plotted as a function of input versus output.

8. The method claimed in claim 7, wherein the maximum and minimum slopes are equal to 1.

9. The method of claim 4 wherein the second composite function is applied with a second spatial filter.

10. A method of applying a tone scale function $T(x)$ that is compressive and expansive to a digital image, the method comprising:

a) decomposing the tone scale function into at least two composite functions the first being expansive, and the second being compressive that can be applied sequentially to the digital image;

b) applying the first composite function to the digital image with a tone scale applicator with a spatial filter to produce a tone scaled digital image; and c) applying the second composite function to the tone scaled digital image to produced an enhanced digital image.

* * * * *

UNITED STATES PATENT AND TRADEMARK OFFICE
CERTIFICATE OF CORRECTION

PATENT NO. : 7,245,781 B2  
APPLICATION NO. : 10/692220  
DATED : July 17, 2007  
INVENTOR(S) : Andrew C. Gallagher et al.

It is certified that error appears in the above-identified patent and that said Letters Patent is hereby corrected as shown below:

| | |
|---|---|
| First page, Column 1, Assignee | Delete "Companny" and insert -- Company -- |
| Claim 1, Column 8, Line 40 | In Claim 1, delete "first-composite" and insert -- first composite -- |
| Claim 4, Column 8, Line 60 | In Claim 4, delete "first-composite" and insert -- first composite -- |

Signed and Sealed this

Eleventh Day of March, 2008

JON W. DUDAS  
*Director of the United States Patent and Trademark Office*